United States Patent Office 3,353,543
Patented Nov. 21, 1967

3,353,543
SMOKE FILTER
Reavis C. Sproull and Richard M. Berger, Richmond, Va., assignors to American Filtrona Corporation, a corporation of New York
No Drawing. Filed Dec. 2, 1964, Ser. No. 415,482
The portion of the term of the patent subsequent to Nov. 16, 1982, has been disclaimed
8 Claims. (Cl. 131—265)

ABSTRACT OF THE DISCLOSURE

Bonded particulate smoke filters, for use with cigarettes and the like comprising a uniform admixture of activated carbon particles and granular tobacco particles, particularly granular tobacco stems, formed into a porous plug by a thermoplastic resin. The tobacco particles preferably have a particle size of between approximately 10 and approximately 200 mesh, with the ratio between tobacco particle size and carbon particle size being from approximately 2:1 to 0.5:1, preferably approximately 1:1. The presence of the tobacco particles functions to improve the taste of the otherwise bonded carbon filter by reducing filtration efficiency with an attendant reduction in cost. The granular form of the tobacco particles precludes blocking the effectiveness of adjacent activated carbon particles which would result in channeling as with the use of tobacco shreds.

---

This invention relates generally to smoke filters, and is particularly concerned with the provision of a smoke filter such as can be used easily as a cigarette filter, cigar filter, pipe filter, or the like.

Although the smoke filter of the invention can have diverse applications, the invention itself and the advantages thereof can possibly be most easily comprehended when consideration is given to the same as applied to cigarette filters. Thus, without limitation, the invention is discussed and considered herein in this environment.

As is well known to those skilled in the cigarette filter art, filamentary-type filters (normally cellulose acetate tow segments), have found widespread commercial use. While these filters can be made at comparatively high speeds, the raw materials used therein are somewhat expensive, and moreover, cellulose acetate filters do not exhibit any significant filtration of the vapor phase of smoke passing therethrough.

On the other hand, the more efficient type filters which have heretofore been developed, present some practical and/or commercial disadvantages. For example, merely sprinkling or dispersing activated carbon particles in a cellulose acetate tow results in increased material cost, and an additional production step in handling the tow and even then, the efficiency of filtration is not a maximum. With the type of filter units which incorporate a pair of spaced-apart filamentary tow segments with loose activated carbon particles therebetween, there is a problem from the production standpoint of inserting the loose activated carbon particles in position between the respective tow segments. Additionally, maximum filtration per particle is not achieved because it is virtually impossible to completely fill the space between the segments with the activated carbon particles, and thus the particles remain "loose" and there is some channeling of smoke through the particle section of the filter unit.

The filtration disadvantages attendant to cellulose acetate filters in general, attendant to filamentary tow-type filters having activated carbon particles dispersed therein, and attendant to segmented filters including a spaced pair of tow segments with loose activated carbon therebetween can be overcome by utilizing a so-called "bonded activated carbon" filter element. Such a filter element includes activated carbon particles bonded into a stable rod by a suitable particulate bonding agent, such as, for example, polyethylene. Bonded activated carbon filter segments have previously been successfully produced, and in fact, are described in considerable detail in the following United States patent applications assigned to the same assignee as the instant application, both now abandoned:

Serial No. 343,463, filed Feb. 10, 1964
Serial No. 306,343, filed Sept. 3, 1963

Bonded activated carbon type cigarette filters have been found to possess highly efficient filtration properties. This fact subjects such filters to at least one present commercial disadvantage, namely—not all segments of the public are at present willing to accept better filtration, and to the contrary, some segments of the smoking public are apparently more concerned with "taste" properties than with filtration efficiency.

There thus remains a need for a cigarette filter which is not subjected to the aforesaid limitations, and the primary object of the present invention is to provide such a filter.

More particularly, it is an object hereof to provide such a filter which has the general advantages of the "bonded activated carbon" type filter, but which possesses taste properties acceptable to the "taste sensitive" segment of the smoking public.

To achieve more so-called "taste" in the filtered smoke, one can reduce the filtration efficiency. By reducing the activity of the filter element, more of the smoke constituents pass to the user during dynamic operation of the cigarette—i.e., during smoking thereof. Yet, reducing filtration efficiency does not necessarily yield a cigarette with desirable taste properties, nor is a reduction in filtration efficiency with an attendant reduction in cost easily achieved. For example, sawdust, being a well known waste product and filler material, might initially be given consideration for use in a "bonded activated carbon" cigarette filter. However, sawdust, among other things, during dynamic operation of the cigarette would result in terpene release which itself is very undesirable. This necessitates higher carbon content for a desired filtration or retention of smoke components during the dynamic use of the cigarette resulting in lower filtration per carbon particle. Since the filler material is less expensive than the carbon, such a situation is commercially undesirable.

Similarly, the use of nonactive carbon, such as coal, in combination with activated carbon might initially be considered. Here, however, in operation of the cigarette, coal distillates would inactivate the activated carbon and would become entrained in the smoke passing to the user, and such distillates are undesirable.

Other inert materials might be considered, such as, for example, increased bonding agent might be used, yet, this approach increases cost substantially.

The selection of a material to be used to reduce the activity of a bonded activated carbon filter element, at least in any substantial quantitive amount, presents and initial problem. Aside from the fact that the material should not, during dynamic operation of the cigarette, release undesirable and/or additional foreign matter or contaminants, the material should be relatively inexpensive and, such that it can be controlled to reach an equilibrium in the ultimate filter unit whereby a moisture content of approximately 12 to 13 percent can be maintained in the burnable tobacco section of the cigarette.

Additionally, the material should be such that when it is warmed and/or heated by the smoke passing therethrough, the solids and vapors released therefrom do not tend to block or over-counterbalance the activity of the carbon particles so that the efficiency of individual carbon particles is reduced. Even further, the material, as indicated, should be as inexpensive as possible. The moisture equilibrium qualities, the relative costs, and the freedom from objectionable volatile components during dynamic operation of a cigarette incorporating the filter are generally essential requisites for the material itself.

From the structural standpoint, however, further limitations are imposed. The material should be such in this regard, that it is susceptible to high speed bonding operation. Furthermore, for moisture and activity equilibrium maintenance, the material should be such that it can be generally uniformly distributed throughout the ultimate filter element. Going one step further, the material must also take a form (a) wherein any components which are released therefrom into the smoke stream during dynamic operation of the cigarette do not overcome the activity of any local section of activated carbon particles so as to block the same and (b) wherein the structural rigidity and/or stability of the ultimate filter element is not substantially weakened in any plane by the presence of the material.

We have found that tobacco itself will substantially meet all of the foregoing qualifications. However, untreated tobacco in the form in which it is normally available (i.e., without special treatment) is not satisfactory. For example, tobacco dust cannot be used in any substantial quantity if for no other reason than because it necessitates an increase in the bonding agent which is used. Moreover, cut tobacco in ribbon, strip or filler form (i.e., predominately shreds having a length which exceed the width and/or depth thereof) is not satisfactory because it is not subject to being uniformly distributed throughout the ultimate filter element and because a given shred during dynamic operation, would seemingly tend to release its volatile components into the smoke stream in a manner which may block the effectiveness of adjacent activated carbon particles and thereby result in some channeling and/or ineffective filtration of the smoke.

Thus, while tobacco itself is a material which possesses many of the characteristics desirable for use in a "bonded activated carbon" filter to meet the aforesaid conditions, we further found that in its normally existent condition, tobacco is not satisfactory. Instead, the tobacco must be ground so that it has a granular form. More specifically, consistent with this specification, granular tobacco means tobacco particles of irregular shapes with the dimensions of the particles on the average being approximately the same in any direction. Any given particle, quite naturally, may have irregular dimensions, but on the average, the particles of granular tobacco would not be in ribbon, strip or filler form, and instead would be more in the form of particles having generally equal dimensions.

The tobacco itself which is incorporated may be any part of the tobacco plant, but preferably consists of ground and granular tobacco stem material. Tobacco stems are generally waste material. They have previously found application as used in reconstituted tobacco, but consistent with the present invention, there is no need to reconstitute the stems although they should be dried and moisture controlled according to conventional techniques.

From the preceding, it will be understood that we have found that the requirements set forth above can be met by providing a cigarette filter incorporating activated carbon particles, granular tobacco particles and a bonding agent therefor. We have further found that the granular tobacco particles can be formed from otherwise waste material, namely tobacco stems, and without subsequent treatment such as required for reconstituted tobacco.

By using granular tobacco, voids in the filters are substantially prevented so that any channeling of the smoke is essentially avoided. Additionally, the use of granular tobacco is important because it permits the "tacking" or joining of individual particles with a minimum of surface area covered with the bonding agent so that there is a maximum surface area exposure to the smoke stream. Thus, the granular tobacco particles during dynamic operation of the cigarette, and upon being heated by the smoke traveling therepast or therethrough, tend to release tobacco flavor and aroma constituents in much the same manner as a conventional non-filter cigarette. Yet, in the ultimate unit, the granular tobacco particles do not interfere substantially with the activity of individual activated carbon particles allowing for uniform operation of the filter.

In accordance with the invention, activated carbon particles are homogeneously intermixed with particles of a thermoplastic bonding agent and with granular tobacco particles. The activated carbon particles have a particle size whereby they pass through a 10 mesh screen but are retained on a 200 mesh screen, and preferably whereby they pass a 20 mesh screen and are retained on a 50 mesh screen. The tobacco particles have a particle size within these general and preferred ranges, yet the ratio between the tobacco particle size and the activated carbon particle size is preferably maintained within limits whereby it does not exceed 2 to 1 or decrease below ½ to 1 with the particle size of the tobacco particles and activated carbon particles preferably being maintained substantially equal.

The bonding agent incorporated, as previously indicated, is a thermoplastic material such as, for example, a polyhydrocarbon having from 2–10 carbon atoms, preferably a polyolefin, polyethylene being the most advantageous material. The particle size of the bonding agent in the initial mixture should be a maximum of 100 microns, but preferably below 50 microns.

The bonding agent is present in a minimum amount of approximately 5% by weight, a practical minimum being about 6½% by weight. Maximum bonding agent quantity is 30% by weight although the relative cost of this material renders 15–20% by weight a commercial maximum.

At least about 20% by weight of carbon particles and 20% by weight of tobacco particles are necessary for satisfactory filtration although the ratio of these materials beyond the minimum may be varied as will be shown hereinafter to control the activity of the filter to a desired level.

Having selected desired sized activated carbon particles, desired sized ground tobacco particles, and bonding agent particles, various procedures can be used to form an ultimate stable rod which can itself be used, or segments of which can be used in a cigarette filter. An exemplary technique in this regard is as follows:

*Exemplary process*

Weighed amounts of activated carbon particles, polyethylene particles and ground tobacco stems are fed to a conventional blending machine of the type incorporating a spiral agitator and adapted to carry out a dough-mixing type operation. Such machines, as is well known, can easily provide a simultaneous mixing and kneading action, that is, the respective particles of activated carbon, bonding agent and granular tobacco are worked together while they are being homogeneously intermixed. After the initial blending operation of the particles, the mixture is poured into a vertically disposed filter-shape cavity (bore in a block). The cavity with the mixture therein is heated slightly above the melting temperature of the bonding agent being used and the cavity and mixture are then allowed to cool. The so-formed rod is dropped or punched out by overturning the cavity.

Using the above described process and/or other processes available to make ultimately stable cigarette filter elements consistent with the invention, it was found that the same achieved the desired results.

As specific examples of filters constructed in accordance herewith, attention is directed to the chart below. As set forth in such chart, the invention was tested by comparing the retention percent of the filter element with respect to acrolein and hydrogen cyanide, with a conventional cellulose acetate tow filter and a "bonded activated carbon" filter free from tobacco particles.

CHART

| Ex. No. | Ingredient | Particle Size | Weight Percent | Retention, Percent | |
|---|---|---|---|---|---|
| | | | | Acrolein | HCN |
| 1 | Activated Carbon | 20 x 50 (mesh) | 59 | 77 | 63 |
| | Ground Tobacco Stems | 20 x 50 (mesh) | 30 | | |
| | Bonding Agent (polyethylene) | 10-20 (micron) | 11 | | |
| 2 | Activated Carbon | 20 x 50 (mesh) | 44½ | 62 | 48 |
| | Ground Tobacco Stems | 20 x 50 (mesh) | 44½ | | |
| | Bonding Agent (polyethylene) | 10-20 (micron) | 11 | | |
| 3 | Activated Carbon | 20 x 50 (mesh) | 30 | 56 | 43 |
| | Ground Tobacco Stems | 20 x 50 (mesh) | 59 | | |
| | Bonding Agent (polyethylene) | 10-20 (micron) | 11 | | |
| 4 | Cellulose Acetate Tow | | | ¹ 0 | ¹ 0 |
| 5 | Activated Carbon | 20 x 50 (mesh) | 89 | ¹ 90-95 | ¹ 80-85 |
| | Ground Tobacco Stems | | 0 | | |
| | Bonding Agent (polyethylene) | 10-20 (micron) | 11 | | |

¹ Approximate.

The filter elements of Examples 1–3 described in the preceding chart were formed according to the process described in some detail above. Such filter elements had a length of approximately 10 millimeters and a diameter of approximately 8 millimeters.

As a basis for comparison against the samples of Examples 1–3 of the chart above, consideration can be given to the retention percent for acrolein and hydrogen cyanide of conventionally made cellulose acetate tow type filaments and "bonded activated carbon" filters having no granular tobacco therein as shown in Examples 4 and 5 respectively of the chart. A cellulose acetate filter of the same dimensions as those discussed immediately above, has substantially zero retention percent for acrolein and substantially zero retention percent for hydrogen cyanide. On the other hand, a "bonded activated carbon" filter having the same particle size as the samples of Examples 1–3 of the chart and being made in the same manner, but with 89 percent by weight of activated carbon particles, 11 percent by weight of binder particles, and zero percent by weight of granular tobacco particles has an approximate acrolein retention percent of between 90 and 95 percent and hydrogen cyanide retention percent of between 80 and 85 percent.

From the comparison noted, it should be apparent that the filter of the present invention over the standard puff life thereof exhibits a significantly improved retention of acrolein and hydrogen cyanide over conventional cellulose acetate tow type filters, while not being quite as efficient as a "bonded activated carbon" filter constructed in with the above listed prior applications assigned to the same assignee. It should further be noted that with the invention, the retention percent for both acrolein and hydrogen cyanide can be adjusted by adjusting the quantity of granular tobacco particles incorporated in the filter. Thus, in addition to the advantages from the ingredient cost standpoint and in addition to other advantages prescribed previously in this specification, a filter element constructed in accordance with the present invention yields a control over the constituents passing therethrough so that, in turn, the taste can be controlled to meet the requirements of different segments of the smoking public.

At present, the acrolein output of a cigarette is believed to provide an indication of the taste qualities thereof. It is for this reason that acrolein was selected as one of the components for the basis of the noted comparison.

With specific respect to the particle size ranges set forth above, it has been found that if the particles of granular tobacco are too large, than a uniform rod can not be formed. On the other hand, if the particles are too small, then the amount of binder required is excessive and the resistance to draw increases to undesirable limits.

This consideration is particularly important to the inclusion in the filter of granular tobacco or tobacco granules rather than dust. For example, if the ordinary treated and dried tobacco leaf is used, and the grinding is performed thereon, then one obtains dust. On the other hand, if tobacco stems, stalks, or the like are used and the same is ground and screen consistent herewith, then particles are obtained. The particles themselves are generally uniform, as indicated, and by following a suitable forming process, such as the process discussed above, there is a generally uniform distribution of tobacco in the ultimate filter element which permits one to maintain equilibrium conditions through the filter and the ultimate cigarette.

After reading the foregoing specification, it will be readily apparent that the objects set forth at the outset hereof have been successfully achieved.

Accordingly, what is claimed is:

1. In a smoking means of the type wherein a quantity of tobacco is ignited and smoke is drawn therefrom by a smoker, the improvement which comprises a filter means interposed between the smoker and the tobacco, said filter means comprising an elongated plug disposed in said smoking means such that smoke passes therethrough to reach the smoker, said plug consisting essentially of the following constituents:

(a) from in excess of 20 to approximately 75 percent by weight of activated carbon particles, said activated carbon particles having a maximum dimension which is a small fraction of the minimum dimension of said plug;

(b) from in excess of 20 to approximately 75 percent by weight of granular tobacco particles, said tobacco particles having a maximum dimension which is a small fraction of the minimum dimension of said plug; and (c) from at least 5 to approximately 30 percent by weight of a thermoplastic resin, said thermoplastic resin being operative essentially alone to effect bonding bridges between juxtaposed constituents through heating and subsequent cooling, with the temperature of the resin at which the bonding is effective exceeding that of the normal temperatures of smoke passing through said plug;

said plug further being characterized by:

(1) said activated carbon particles serving as the major active component of said plug and being active to remove both solid and gas phase constituents from smoke passing through said plug during utilization of said smoking means;

(2) said thermoplastic resin essentially alone serving as a binder between said constituents and defining a multiplicity of discrete bonding means predominantly individually smaller than said activated carbon and tobacco particles;

(3) said constituents cooperating through said bonding means to give structural continuity to said plug as a self-sustaining, substantially particulate stable body in the form of a continuous porous matrix with the discrete bonding means and constituents providing a labyrinth of smoke passages therethrough;

(4) said constituents being comingled in any cross-section of said body and with said activated carbon and tobacco particles randomly arranged in said plug such that a multiplicity of said activated carbon and tobacco particles are present in substantially any cross-section of said body; and (5) said body deriving its stability substantially only from said cooperation between said bonding means and said constituents.

2. The improvement according to claim 1 wherein said thermoplastic resin is polyethylene.

3. The improvement according to claim 1 wherein said tobacco particles are in the form of granular tobacco stems.

4. The improvement according to claim 1 wherein said tobacco particles have a particle size of between approximately 10 and approximately 200 mesh.

5. The improvement according to claim 4 wherein said tobacco particles have a particle size of between approximately 20 and approximately 50 mesh.

6. The improvement according to claim 1 wherein said tobacco particles have a particle size of between approximately 10 and approximately 200 mesh, and wherein the ratio between tobacco particle size and carbon particle size is from approximately 2:1 to 0.5:1.

7. The improvement according to claim 6 wherein said ratio is approximately 1:1.

8. The improvement according to claim 1 wherein said plug consists essentially of from about 30 to 60% activated carbon particles by weight and approximately 60 to 30% tobacco particles by weight bonded together by a particulate polyhydrocarbon binding agent having from 2 to 10 carbon atoms, the ratio between tobacco particle size and carbon particle size being from approximately 2:1 to 0.5:1.

References Cited

UNITED STATES PATENTS

| 1,310,404 | 7/1919 | Irving | 131—261 X |
| 2,765,515 | 10/1956 | Knudson | 131—266 X |
| 3,101,723 | 8/1963 | Seligman et al. | 131—266 |
| 3,217,715 | 11/1965 | Berger et al. | 131—267 X |

FOREIGN PATENTS 628,238  9/1961  Canada.

SAMUEL KOREN, *Primary Examiner.*

D. J. DONOHUE, *Assistant Examiner.*